Nov. 13, 1934.　　　G. M. DARBY　　　1,980,257
BEET SUGAR MAKING
Filed Sept. 22, 1930
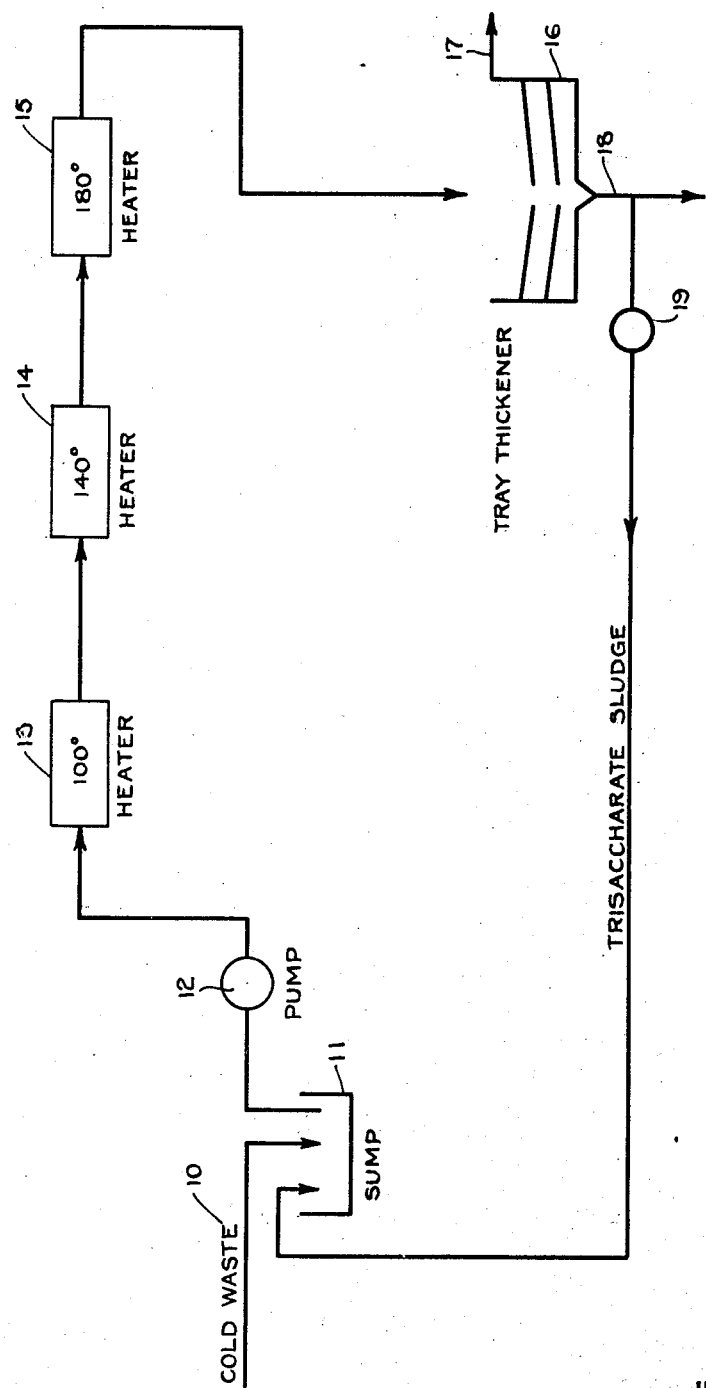

Patented Nov. 13, 1934

1,980,257

UNITED STATES PATENT OFFICE 1,980,257

BEET SUGAR MAKING

George M. Darby, Westport, Conn., assignor, by mesne assignments, to The Dorr Company, Inc., New York, N. Y., a corporation of Delaware Application September 22, 1930, Serial No. 483,454

3 Claims. (Cl. 127—47)

This invention relates to a method for facilitating the precipitation of a saccharate such as tri-calcium saccharate ($3CaOC_{12}H_{22}O_{11}$) from the cold wash in the Steffens method for recovery of sugar from molasses.

In the Steffens method, it has heretofore been the common practice to dilute the molasses to a sugar content of approximately five percent, to next add powdered lime to the diluted molasses and then permit the resultant mixture to cool. This mixture ordinarily consists of calcium saccharates, 80 percent of which is precipitated from the solution as a finely divided solid while the other 20 percent remains in solution. The mixture is then immediately filtered and the filtrate, together with any wash employed in the filtration method, is called the cold waste. To conclude the method, the cold waste is heated in stages of 100°, 140°, and 180° F., each successive heating operation serving to precipitate a large part of the calcium saccharate remaining in solution. The use of this method of precipitating tri-calcium saccharate forms a very fine precipitate that will not settle and that is difficult to filter. It is an object of the present invention therefore to obviate this latter disadvantage.

The present invention contemplates settling of the precipitated solids from the hot waste liquid after the heating operation in some apparatus such as a Dorr thickener, removing the clear liquid and returning a small portion of such settled solids to the cold waste prior to its heating; such returned solids serving as a nucleus or seed upon which the tri-calcium saccharate in solution may build to form a precipitate that is more granular in its nature, which settles faster, and which filters and washes more efficiently. The method is based upon the principle that the presence of solids in the waste for precipitation, by heating, seeds the mixture and promotes growth on the seed rather than to form new precipitate. The fact that the precipitate thus formed by this method is granular and settles well is an advantageous feature of the invention, but the larger benefit resides in the improvement in the filtration qualities of the precipitate formed. Such a precipitate filters much more readily and washes better with less water. Actual experience has shown that a return of approximately 10 per cent of the total solids gives maximum precipitation and forms the largest crystals. Any amount of return less than or in excess of this amount does not afford proper precipitation. The method is further characterized by the fact that no mixing equipment for the return solids and the cold waste is required, the returning of the solids into the sump containing the cold waste being sufficient, since the pump which forces the mixture through the heaters has adequate agitating effect on mixture to perform this function.

With the above objects in view which will more readily become apparent as the nature of the invention is better understood, the same consists in the novel method disclosed in the accompanying sheet of drawing in which;

The figure is a flow sheet showing the arrangement of parts employed in carrying out the method.

The cold waste proceeding from the Steffens process and consisting of tri-calcium saccharate in solution is designated by the reference numeral 10. This waste enters a sump 11 from which it is conveyed by means of a pump 12 to a primary heater 13. In this heater the waste is brought to an even temperature of 100° F. in order to precipitate part of the tri-calcium saccharate from solution. The solution together with the precipitated solids in suspension are then carried to a secondary heater 14 and in this heater an additional precipitate is obtained by bringing the bulk of the solution to an even temperature of 140°. From this heater, the material is carried to tertiary heater 15 which is adapted to maintain the entire mass at an even temperature of 180°. In this latter heater practically all of the tri-calcium saccharate remaining in solution is precipitated and the hot waste containing the precipitated solids are carried to a sedimentation apparatus 16. While this sedimentation apparatus employed may be of any particular type, it is deemed preferable to employ an apparatus such as the Dorr tray thickener. However, irrespective of these details in carrying out the method, the essential features of the invention are preserved.

The process thus far outlined is well known and has heretofore been employed subsequent to the completion of the Steffens process. It has been found that where this process has been employed without modification the precipitate formed is in the form of a very finely divided suspended solid which not only settles very slowly but which is difficult to filter. The novelty of the present process resides in returning a portion of the tri-calcium saccharate sludge, settled from the sedimentation apparatus, to the cold waste before it enters the heaters. The settled tri-calcium saccharate from the sedimentation apparatus 16 is shown at 18. This settled material leaves the sedimentation apparatus as a thick sludge consisting approximately of 5 percent solids and 95 per cent liquids. A portion, the amount of which is determined by actual experiment, and which is ordinarily about 10 percent, of this sludge is conveyed by means of a pump 19 to the sump 11 so that this material may be mixed with the cold waste 10 proceeding from the Steffens process. No mixing apparatus need be employed as the pump 12 ordinarily has sufficient agitating effect to distribute this sludge through the waste before it enters the heaters.

In actual operation it has been found that a return of approximately 10 percent of the tricalcium saccharate sludge issuing from the sedimentation apparatus gives the best results. This would mean a return of about 0.5% actual tri-calcium saccharate. However, conditions may vary from time to time and in certain instances it may be deemed desirable to return a larger or a smaller proportion of the sludge to the cold waste, the amount of which may be controlled by the regulating valve 19.

It is obvious that any of the conditions set forth in this specification may be varied to give the best results for any particular process. Only insofar as the invention as pointed out in the accompanying claims is the same to be limited.

I claim:

1. The method of precipitating saccharate from cold waste water, which comprises heating the cold waste to precipitate a portion of the saccharate, removing the precipitate, and returning approximately 10% of the solids to the cold waste water prior to the heating operation.

2. The method of precipitating tricalcium saccharate from cold waste water which comprises heating the cold waste in a plurality of successive heating steps of increasing temperature to precipitate tricalcium saccharate, removing the precipitated saccharate together with some of the remaining solution, and returning a portion of the removed material to the cold waste prior to the heating operation to facilitate further precipitation of tricalcium saccharate, the returned material containing approximately 10% of the solids removed.

3. The method of precipitating tricalcium saccharate from cold waste water, which comprises heating the cold waste water in a plurality of successive heating steps of increasing temperature to precipitate tricalcium saccharate, removing the precipitate, and returning approximately 10% of the solids to the cold waste water prior to the heating operation to facilitate further precipitation of tricalcium saccharate.

GEORGE M. DARBY.